US009557836B2

(12) United States Patent
Sharp et al.

(10) Patent No.: US 9,557,836 B2
(45) Date of Patent: Jan. 31, 2017

(54) DEPTH IMAGE COMPRESSION

(75) Inventors: Toby Sharp, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 641 days.

(21) Appl. No.: 13/286,966

(22) Filed: Nov. 1, 2011

(65) Prior Publication Data

US 2013/0106994 A1    May 2, 2013

(51) Int. Cl.
*G06K 9/00* (2006.01)
*G06K 9/62* (2006.01)
(Continued)

(52) U.S. Cl.
CPC .............. *G06F 3/038* (2013.01); *A63F 13/42* (2014.09); *G06F 3/017* (2013.01); *G06F 3/0304* (2013.01); *G06K 9/00362* (2013.01); *A63F 2300/1093* (2013.01); *A63F 2300/6045* (2013.01); *G06K 9/00335* (2013.01); *G06K 9/00369* (2013.01); *G06K 9/00375* (2013.01);
(Continued)

(58) Field of Classification Search
None
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    201254344 B    6/2010
CN    102184558 A    9/2011
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Anner Holder
*Assistant Examiner* — William Adrovel
(74) *Attorney, Agent, or Firm* — Tom Wong; Micky Minhas

(57) ABSTRACT

Depth image compression is described for example, to enable body-part centers of players of a game to be detected in real time from depth images or for other applications such as augmented reality, and human-computer interaction. In an embodiment, depth images which have associated body-part probabilities, are compressed using probability mass which is related to the depth of an image element and a probability of a body part for the image element. In various examples, compression of the depth images using probability mass enables body part center detection, by clustering output elements, to be speeded up. In some examples, the scale of the compression is selected according to a depth of a foreground region and in some cases different scales are used for different image regions. In some examples, certainties of the body-part centers are calculated using probability masses of clustered image elements.

20 Claims, 9 Drawing Sheets

(51) Int. Cl.
  *G06T 7/00* (2006.01)
  *G06F 3/038* (2013.01)
  *A63F 13/42* (2014.01)
  *G06F 3/01* (2006.01)
  *G06F 3/03* (2006.01)
  *H04N 19/597* (2014.01)

(52) U.S. Cl.
  CPC .......... *G06K 9/6269* (2013.01); *G06T 7/0081* (2013.01); *G06T 7/0087* (2013.01); *G06T 2207/10028* (2013.01); *G06T 2207/30196* (2013.01); *H04N 19/597* (2014.11)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |

(56) References Cited

U.S. PATENT DOCUMENTS

| | | | |
|---|---|---|---|
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0026838 | A1 | 1/2008 | Dunstan et al. |
| 2010/0197392 | A1* | 8/2010 | Geiss ............................... 463/30 |
| 2011/0085705 | A1 | 4/2011 | Izadi et al. |
| 2012/0002862 | A1* | 1/2012 | Mita .................. G06K 9/00697 382/154 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2010095080 A1 | 8/2010 |
| WO | 2010140613 A1 | 12/2010 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Xia, et al., "Human Detection Using Depth Information by Kinect", In Proceedings of IEEE Computer Society Conference on Computer Vision and Pattern Recognition Workshops, Jun. 20-25, 2011, pp. 15-22.

Shotton, et al., "Real-Time Human Pose Recognition in Parts from Single Depth Images", In Proceedings of IEEE Computer Vision and Pattern Recognition, Jun. 2011, 8 pages.

Alkemade, Remi, "Depth Perception for Augmented Reality using Parallel Mean Shift Segmentation", Published on: Apr. 27, 2011, Available at: http://www.google.co.in/url?q=http://www.ru.nl/publish/pages/629715/alkmade__r__bathesis11.pdf&sa=U&ei=4w1OTsziMInprQezk__SzAw&ved=0CB8QFjAE&usg=AFQjCNHG6bSnb7Gm8hUjVEq7BProuaBjDA.

Forahobby, "How You Become the Controller with Xbox 360 Kinect", Published on: Jan. 11, 2011, Available at: http://www.360-hq.com/article4096.html.

(56) References Cited

OTHER PUBLICATIONS

Chen, et al., "Model Based Object Recognition by Robust Information Fusion", In Proceedings of the 17th International Conference on Pattern Recognition, vol. 3, Aug. 23-26, 2004, pp. 57-60.
Garstka, et al., "View-dependent 3D Projection using Depth-Image-based Head Tracking", In Proceedings of IEEE International Workshop on Projector-Camera Systems, Jun. 24, 2011, 7 pages.
Raca, Mirko, "Improving 3D Human Pose Estimation", Published Date: Jul. 4, 2011, Available at: http://wiki.epfl.ch/edicpublic/documents/Candidacy%20exam/candidacy_edic_raca.pdf.
"First Office Action and Search Report Issued in Chinese Patent Application No. 201210431972.7", Mailed Date: Dec. 1, 2014, 13 pages.
"Second Office Action Issued in Chinese Patent Application No. 201210431972.7", Mailed Date: Jul. 7, 2015, 7 pages.
"Third Office Action Issued in Chinese Patent Application No. 201210431972.7", Mailed Date: Nov. 26, 2015, 8 pages.

\* cited by examiner

DEPTH IMAGE COMPRESSION

BACKGROUND

Depth images from depth cameras are increasingly used to detect people and objects in scenes for many applications such as to find positions of human or animal body-part centers, to find positions of objects in scenes and for other purposes such as medical image analysis. Processing the depth images is typically computationally expensive and time consuming.

Finding positions of human or animal body-part centers in image data such as depth images, color video images and other types of images may be useful in many application domains such as augmented reality, immersive gaming, human computer interaction and others. In many of these application domains body-part center positions are to be predicted in real-time and often the available image data may be noisy or incomplete. In some cases the computing resources available may comprise graphics processing units that are operable in parallel to give fast processing times. However, this is not always the case. There is a need to reduce the amount of computation without significantly impacting accuracy and usability of the resulting body-part center positions.

Existing body-part position detection systems may involve several stages of computation. Typically a detection system is trained in advance using labeled image data.

The embodiments described below are not limited to implementations which solve any or all of the disadvantages of known depth image compression systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Depth image compression is described for example, to enable body-part centers of players of a game to be detected in real time from depth images or for other applications such as augmented reality, and human-computer interaction. In an embodiment, depth images which have associated body-part probabilities are compressed using probability mass which is related to the depth of an image element and a probability of a body part for the image element. In various examples, compression of the depth images and probability mass images enables body part center detection to be speeded up. In some examples, the scale of the compression is selected according to a depth of a foreground region and in some cases different scales are used for different image regions. In some examples, certainties of the body-part centers are calculated using probability masses of clustered image elements.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer game system, the system described is provided as an example and not a limitation. As those skilled in the art will appreciate, the present examples are suitable for application in a variety of different types of computing and image processing systems. The examples describe using body part probability information. However, the probability information may be about other classes such as object classes.

Figure 1:
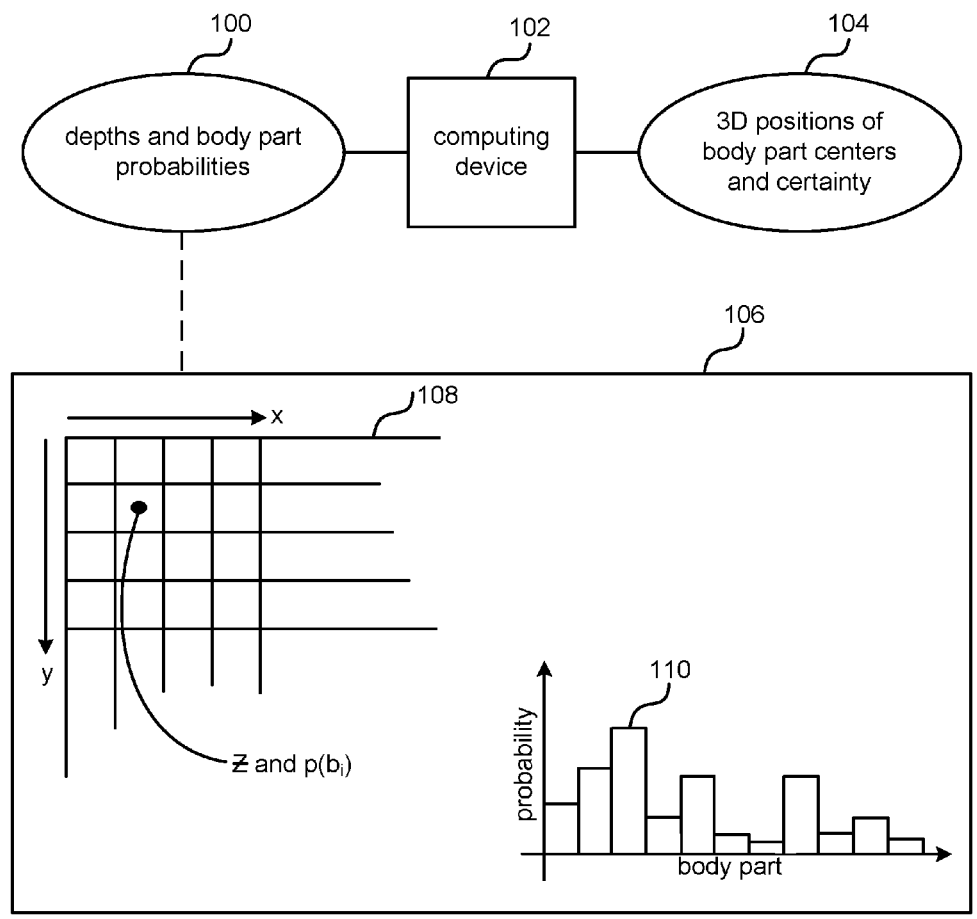
FIG. 1 is a schematic diagram of a body-part center position detection system.

FIG. 1 is a schematic diagram of a body-part center position detection system implemented at computing device 102. The computing device 102 receives a depth image of a scene depicting at least one player of a game or any human or animal body or part of a human or animal body. The depth image may be part of a stream of depth images from a depth camera or other image capture device. Associated with the depth image are body part probabilities which have been computed from the depth image by another process. Thus the computing device 102 receives depths and body part probabilities 100. Using this information the computing device calculates 3D positions of body part centers 104 together with a measure of certainty of those 3D positions. The body part center information may be used for skeletal tracking of players, for gesture detection, or other purposes.

Each image element of the depth image may have an associated probability distribution representing the probability that the image element depicts each of a plurality of specified classes. In some examples the classes are body parts but other classes may be used such as object classes (e.g. building, sky, person, coffee mug) or other classes. For example, the probability distribution represents the likelihood that the image element is a member of each of the classes. In one example, there are 31 or more different body parts although any number of body parts may be specified. Examples of body parts include but are not limited to: head, neck, shoulder, arm, elbow, wrist, hand, torso, leg, knee, ankle, foot. As illustrated in FIG. 1 in region 106, the depth image may be represented as a two-dimensional array 108 of image elements (partly shown in FIG. 1) where an image element may be a pixel, patch of pixels, or other group of pixels or may be a voxel, group of voxels or other image element of dimension higher than 2. In the example illustrated in FIG. 1 each image element has a depth value (represented by symbol Z) and an associated probability distribution (represented by symbol p(bi). The probability distribution may be thought of (in an example) as a histogram 110 of probability against body part as illustrated in FIG. 1. The histogram stores a probability value for each body part representing a probability that the particular image element depicts the specified body part.

The body part probabilities, such as the histogram 110 or other representation of a probability distribution, are obtained from the depth image using any suitable known process for achieving this. For example, this process takes an input depth image and segments it into a dense probabilistic body part labeling. The segmentation into body parts is treated as a per-pixel classification task. A deep randomized decision forest classifier is trained using typically hundreds of thousands of training images. The classifier uses discriminative depth comparison image features to yield 3D translation invariance while maintaining high computational efficiency. For further speed the classifier may be run in parallel on each pixel on a graphics processing unit. Once trained the classifier is used to carry out the per-pixel classification and produces a probability distribution for each pixel representing the probability that pixel depicts each of a plurality of body parts.

The computing device 102 takes the depths and body part probabilities 100 and produces 3D positions of body part centers 104 together with certainty information. At a high level, the computing device 102 may be thought of as clustering the depth and probabilities to produce the body part centers. Carrying out clustering on the depths and body part probabilities 100 is computationally expensive and so difficult to achieve in real time, especially where computing resources are limited (such as embedded systems or when no graphics processing units are available). The examples described herein use an image compression process to compress the depths and body part probabilities 100 and then carry out clustering on the compressed image to produce the body part centers. The image compression process is designed to mitigate against loss of accuracy in body part center detection. To do this, the image compression process takes into account a characteristic referred to herein as probability mass.

Figure 2:
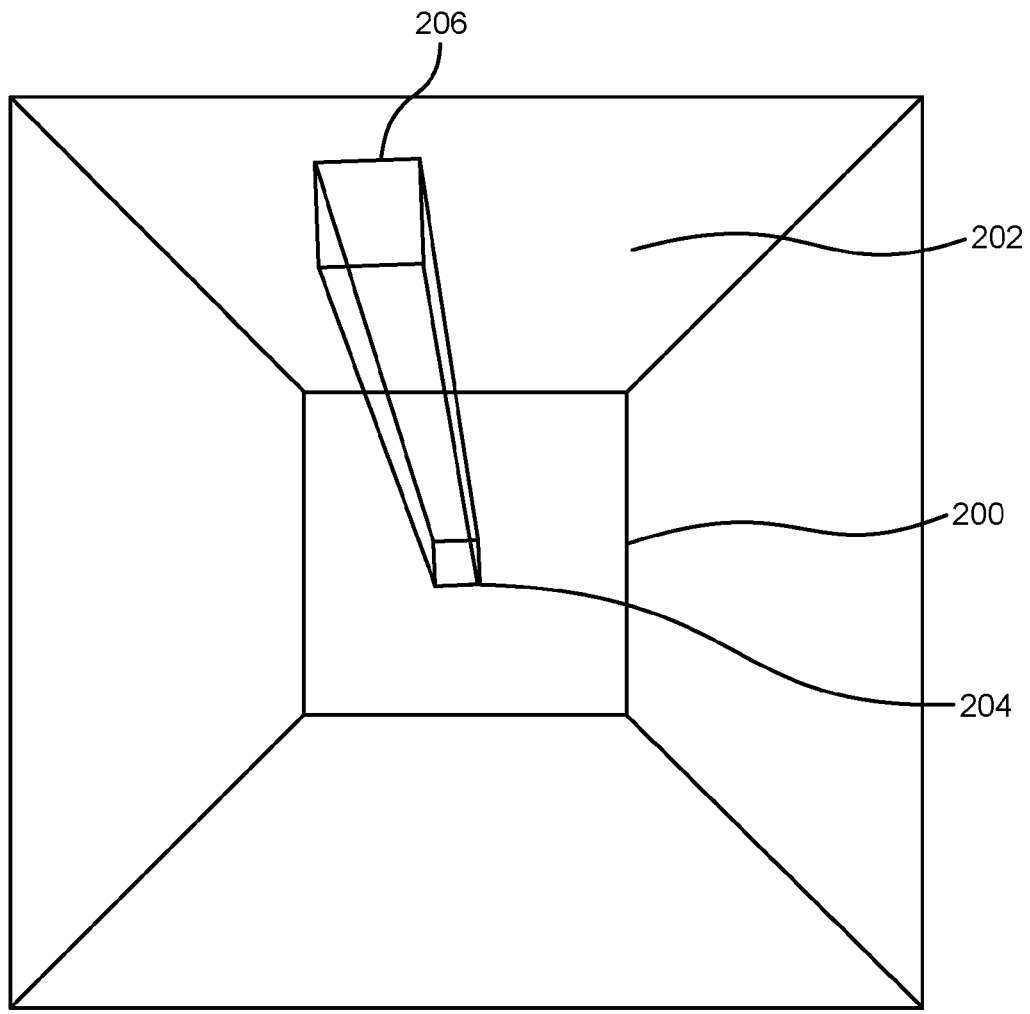
FIG. 2 is a schematic diagram of a region near to a depth camera and another region far from a depth camera.

Probability mass is now explained in more detail with reference to FIG. 2 which is a schematic diagram of a region 200 near to a depth camera and another region 202 far from a depth camera. An image element 204 at the depth camera depicts a region 206 in a scene which is far from the depth camera. The surface area of the depicted region 206 related to the surface area of the image element 204 by the square of the depth (or distance of the depicted region from the camera). The probability mass for a given body part and image element is defined as the probability input value (i.e. the probability that the image element depicts the body part) multiplied by the square of the depth value at the image element. This ensures that image elements far away are given equivalent probability mass to image elements close to the camera. More generally, probability mass is related to the depth of the image element and to the probability of the body part given the image element.

Figure 3:
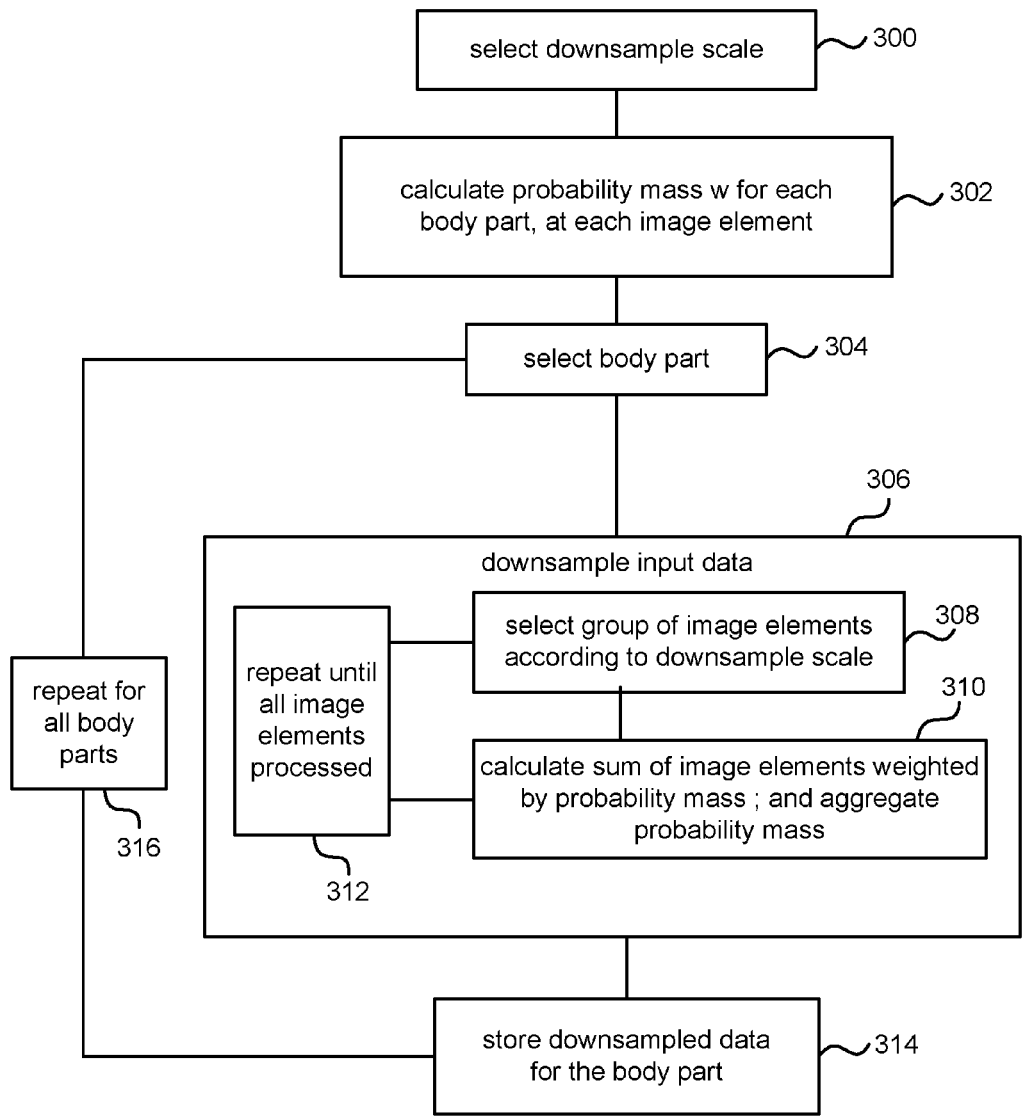
FIG. 3 is a flow diagram of a method of image compression for fast body-part center detection.

FIG. 3 is a flow diagram of a method of compressing a depth image which has associated body-part probability information at each image element. A downsample scale is selected 300. In some examples this scale is selected automatically and may be dynamically adjusted. In other examples the scale is preconfigured and in other examples it is manually set by a user on the basis of empirical data.

A probability mass w is calculated 302 for each body part at each image element. For example, if there are 31 body parts then 31 probability masses are calculated at each image element. The probability mass may be calculated using the depth and the probability information as mentioned above.

A body part is selected 304 and a process 306 for downsampling the input data is initiated. A group of image elements from the depth image is selected 308 according to the downsample scale. For example, the group may be a block of four neighboring image elements which form a square where the depth image is represented as a two dimensional array of image elements. However, it is not essential to use a block of four image elements, other sizes of block or other shapes or regions may be used. In some examples the group of image elements may be of three or higher dimensions.

The probability values of the image elements in the selected group are aggregated, for example, by carrying out a sum weighted by probability mass, and the aggregate value is stored. The aggregate probability mass of the image elements of the group is also calculated and stored.

Another group of image elements (for example, the next block of four image elements in the 2D array) is selected and the aggregation process repeated until all the image elements of the depth image are processed 312.

The downsampled input data is stored 314 for the body part. The next body part is selected and the process repeats until all body parts are processed 316. In this way the input image is compressed in the sense that the size of the downsampled data is smaller than the input data. For example, each d×d block of probabilities and depths is reduced to an output element such as a vector (x, y, z, w) where x, y, z are the center of mass for the input probabilities and w is the total probability mass. In examples where body part probability information is used the output element may be referred to as a downsampled body part vector. It is not essential to use a vector format for the output elements; other formats may be used. The output element comprises characteristics of a probability distribution such as x, y, z and a probability mass w.

The method of FIG. 3 may be carried out at least partially in parallel using multi-threading or in any other suitable manner. For example, the downsampling process 306 may be carried out in parallel for each body part. Also, the downsampling process itself may make use of parallel processing.

By retaining the aggregate probability mass information in the output elements and by taking into account the probability mass information during the aggregation of the probability values, the output elements retain information which enables body part centers to be determined using clustering. However, as the output elements are compressed in size compared with the original input data the clustering process is less computationally expensive.

The downsampling process may be thought of as trading off accuracy versus computation time. The accuracy levels to produce workable results vary according to how near or far the subjects (human or animal bodies) are from the depth camera. This may be taken into account by appropriate selection of the downsample scale at step 300 of FIG. 3. For example, the downsample scale may be selected according to the depth of a foreground region of the depth image. Typically the foreground region depicts one or more players or other human or animal bodies in the scene. The depth of the foreground region may be obtained from the depth image itself. For example, if a player is relatively far from a depth camera the accuracy levels may need to be increased as compared with a situation where the player is close to the depth camera. It is possible to dynamically adjust the scale during operation of a game or other system where a continuous stream of depth images are captured and processed using the methods described herein. Also, the scale may be differentially selected for different regions of the depth image. For example, where multiple players are at different depths from the depth camera. In an example, the process of FIG. 3 is modified to select a plurality of scales and calculate a first group of the output elements according to a first one of the plurality of scales and calculate a second group of the output elements according to a second one of the plurality of scales.

Figure 4:
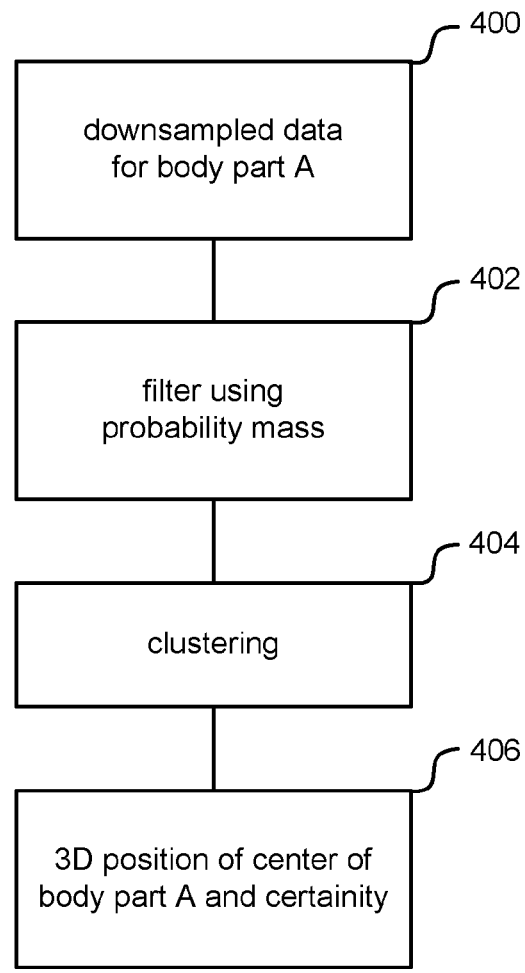
FIG. 4 is a flow diagram of a method of using down sampled body part vectors for fast body-part center detection.

With reference to FIG. 4 the downsampled input data for body part A 400 is received and filtered 402 according to probability mass. For example, the filter removes downsampled body part vectors where the compressed body part probability mass is too low. Clustering 404 is carried out on the remaining downsampled body part vectors of the downsampled input data and the cluster (or clusters) which is found provides a hypothesis of the 3D position of the center of body part A. The probability mass may be used to give an indication of the certainty about the 3D position of the center of body part A. Any type of clustering process may be used and a non-exhaustive list of examples is: k-means clustering, agglomerative clustering, mean shift clustering.

Figure 5:
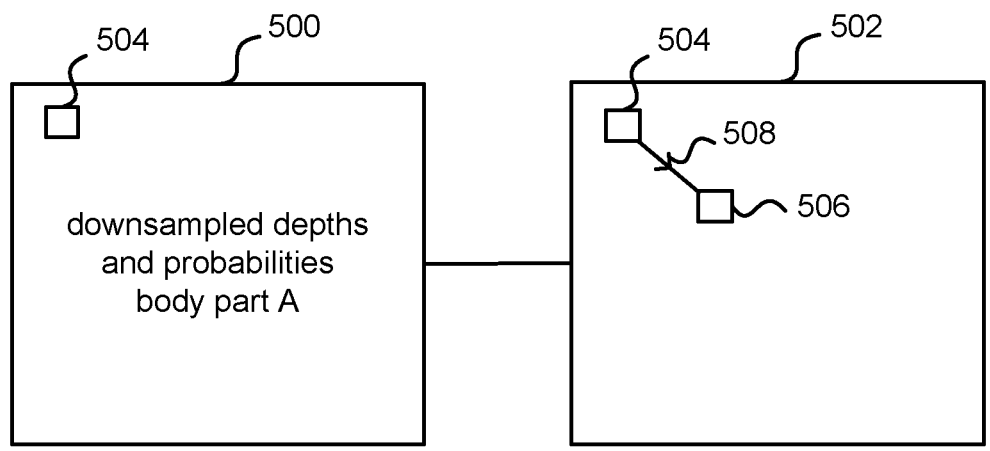
FIG. 5 is a schematic diagram of a mean shift process.
Figure 6:
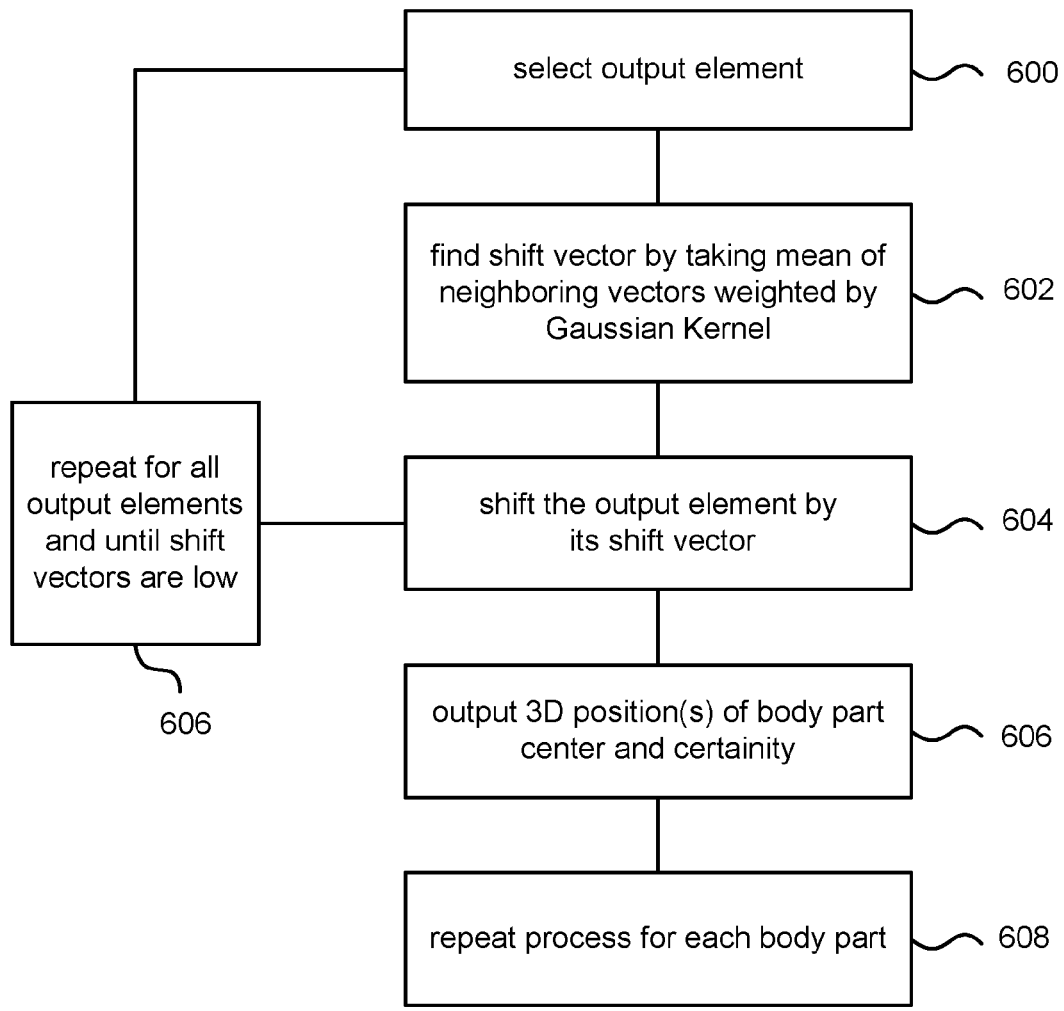
FIG. 6 is a flow diagram of a mean shift process.

In an example, mean shift clustering is used as now described with reference to FIGS. 5 and 6. A mean shift process is illustrated schematically in FIG. 5. Downsampled body part vectors comprising depths and probabilities for body part A are shown at 500. A downsampled body part vector 504 is selected and shifted to a new location 506 in 3D world space. For ease of drawing, 3D world space is depicted as a 2D output region 502 in FIG. 5. A shift vector 508 represents how downsampled body part vector 504 is translated to new location 506. The shift vector is calculated on the basis of neighbors of downsampled body part vector 504 when they are aggregated according to a clustering kernel such as a Gaussian kernel. The process of shifting downsampled body part vectors is repeated for all the downsampled body part vectors of input 500 and until the shift vectors are minimal. At the end of this process the downsampled body part vectors become clustered into one or more clusters. Each cluster represents a possible location of the center of body part A.

A mean shift process is now described in more detail with reference to FIG. 6. A downsampled body part vector is selected 600 from the downsampled data for body part A. For example, this downsampled data is obtained from the process of FIG. 3. The downsampled body part vector may be considered as a vector x, y, z, was mentioned above. A shift vector is found by taking 602 a mean of the vectors of the neighboring downsampled body part vectors weighted by a kernel such as a Gaussian kernel. A Gaussian kernel is a two-dimensional Gaussian function within a window or region that is the same size as a patch formed by the selected downsampled body part vector and its neighbors. Any kernel may be used which acts to cluster the vectors.

The downsampled body part vector is shifted 604 by its shift vector and the next downsampled body part vector is selected 600. This repeats 606 for all the downsampled body part vectors and until the shift vectors are below a threshold. The result is one or more clusters of downsampled body part vectors. The process outputs the 3D position of the cluster(s) as possible 3D positions of the center of the body part. Certainty information is output for each 3D position. The certainty information for a cluster is obtained by aggregating the probability masses w of each downsampled body part vector that moved into that cluster during the mean shift process, by counting the number of downsampled body part vectors that moved into that cluster, or by another process. The process (i.e. steps 600 to 606) may be repeated 608 for each body part. The processing for each body part may be carried out in parallel although that is not essential.

Various of the parameters for the methods described herein may be learnt. For example, the window size of any kernel used in the clustering process, the standard deviation of the Gaussian kernel where this is used in the clustering process, the threshold for the filtering step and any other parameters. For example, the parameters may be set to default values initially and validated against training data. The results of the validation process may be used to adjust the parameter values.

Figure 7:
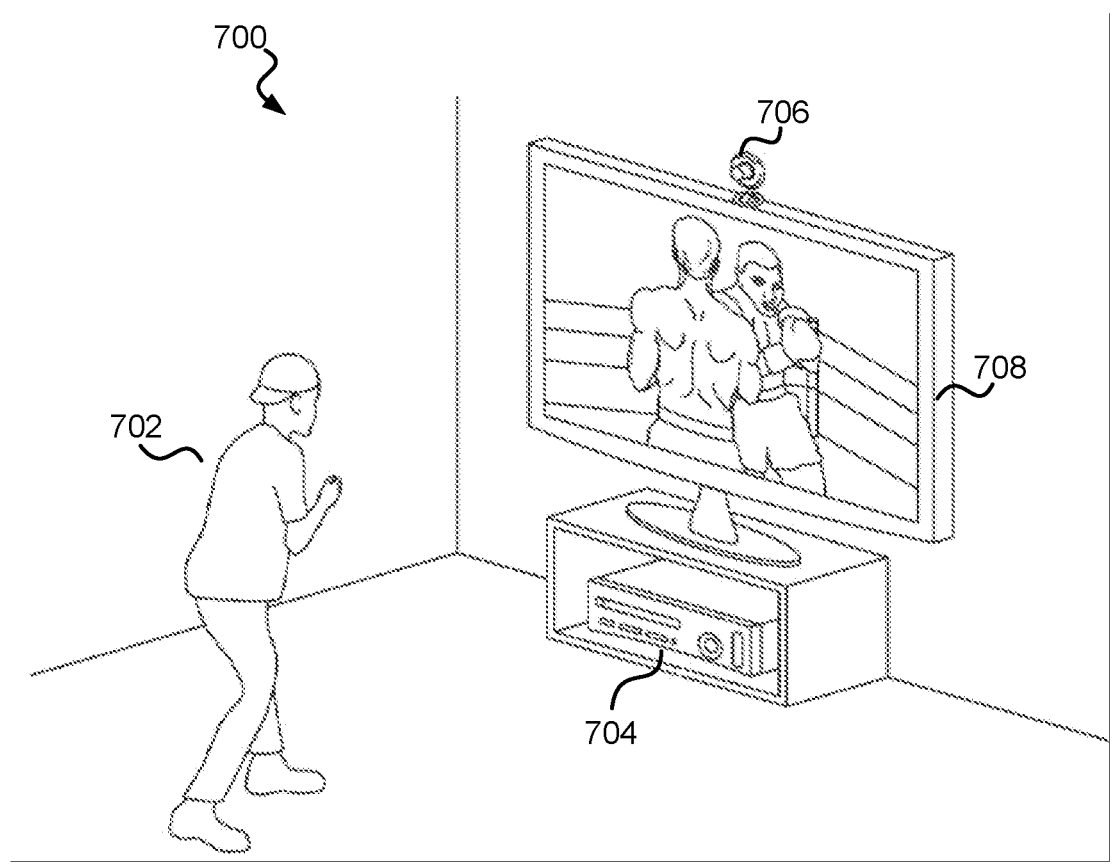
FIG. 7 is a schematic diagram of a camera-based control system for controlling a computer game.

FIG. 7 shows an example camera-based control system 700 for controlling a computer game. The methods described above with reference to FIGS. 2 to 6 may be implemented in the camera-based control system. FIG. 7 shows a user 702 playing, in this illustrative example, a boxing game. In some examples, camera-based control system 700 may be used to, among other things, determine body pose, bind, recognize, analyze, track, associate to a human target, provide feedback, interpret gestures, and/or adapt to aspects of a human target such as the user 702.

The camera-based control system 700 comprises a computing device 704. The computing device 102 of FIG. 1 may be integral with the computing device 704. The computing device 704 may be a general purpose computer, gaming system or console, or dedicated image processing device. The computing device 704 may include hardware components and/or software components such that the computing device 704 may be used to execute applications such as gaming applications and/or non-gaming applications. The structure of the computing device 704 is discussed hereinafter with reference to FIG. 8 and FIG. 9.

The camera-based control system 700 further comprises a capture device 706. The capture device 706 may be, for example, an image sensor or detector that may be used to visually monitor one or more users (such user 702) such that gestures performed by the one or more users may be captured, analyzed, processed, and tracked to perform one or more controls or actions within a game or application, as described in more detail below.

The camera-based control system 700 may further comprise a display device 708 connected to the computing device 704. The computing device may be a television, a monitor, a high-definition television (HDTV), or the like that may provide game or application visuals (and optionally audio) to the user 702.

In operation, the user 702 may be tracked using the capture device 706 such that the joint positions, movements and size of user 702 may be interpreted by the computing device 704 (and/or the capture device 706) as controls that may be used to affect the application being executed by computing device 704. As a result, the user 702 may move his or her body to control an executed game or application.

In the illustrative example of FIG. 7, the application executing on the computing device 704 is a boxing game that the user 702 is playing. In this example, the computing device 704 controls the display device 708 to provide a visual representation of a boxing opponent to the user 702. The computing device 704 also controls the display device 708 to provide a visual representation of a user avatar that the user 702 may control with his or her movements. For example, the user 702 may throw a punch in physical space to cause the user avatar to throw a punch in game space. Thus, according to this example, the computing device 704 and the capture device 706 of the camera-based control system 700 may be used to recognize and analyze the punch of the user 702 in physical space such that the punch may be interpreted as a game control of the user avatar in game space.

Furthermore, some movements may be interpreted as controls that correspond to actions other than controlling the avatar. For example, the user may use movements to enter, exit, turn system on or off, pause, save a game, select a level, profile or menu, view high scores, communicate with a friend, etc. Additionally, movement of the user 702 may be used and analyzed in any suitable manner to interact with applications other than games, for example to enter text, select icons or menu items, control media playback, browse websites or operate any other controllable aspect of an operating system or application.

Figure 8:
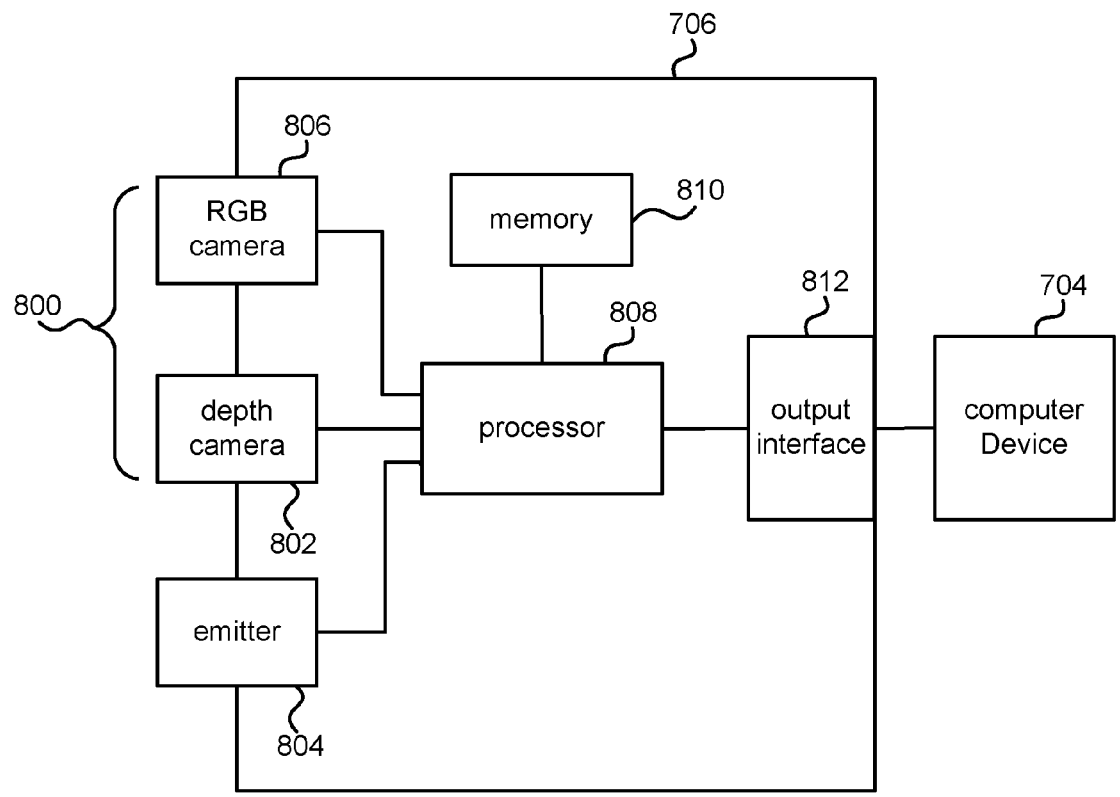
FIG. 8 is a schematic diagram of an image capture device.

Reference is now made to FIG. 8, which illustrates a schematic diagram of the capture device 706 that may be used in the camera-based control system 700 of FIG. 7. In the example of FIG. 8 the capture device 706 is configured to capture video images with depth information. Such a capture device may be referred to as a depth camera. The depth information may be in the form of a depth image that includes depth values, i.e. a value associated with each image element of the depth image that is related to the distance between the depth camera and an item or object located at that image element.

The depth information may be obtained using any suitable technique including, for example, time-of-flight, structured light, stereo image, or the like. In some examples, the capture device 706 may organize the depth information into "Z layers," or layers that may be perpendicular to a Z-axis extending from the depth camera along its line of sight.

As shown in FIG. 8, the capture device 706 comprises at least one imaging sensor 800. In the example shown in FIG. 8, the imaging sensor 800 comprises a depth camera 802 arranged to capture a depth image of a scene. The captured depth image may include a two-dimensional (2-D) area of the captured scene where each image element in the 2-D area represents a depth value such as a length or distance of an object in the captured scene from the depth camera 802.

The capture device may also include an emitter 804 arranged to illuminate the scene in such a manner that depth information may be ascertained by the depth camera 802. For example, in the case that the depth camera 802 is an infra-red (IR) time-of-flight camera, the emitter 804 emits IR light onto the scene, and the depth camera 802 is arranged to detect backscattered light from the surface of one or more targets and objects in the scene. In some examples, pulsed infrared light may be emitted from the emitter 804 such that the time between an outgoing light pulse and a corresponding incoming light pulse may be detected by the depth camera and measured and used to determine a physical distance from the capture device 706 to a position on the targets or objects in the scene. Additionally, in some examples, the phase of the outgoing light wave from the emitter 804 may be compared to the phase of the incoming light wave at the depth camera 802 to determine a phase shift. The phase shift may then be used to determine a physical distance from the capture device 706 to a position on the targets or objects. In a further example, time-of-flight analysis may be used to indirectly determine a physical distance from the capture device 706 to a position on the targets or objects by analyzing the intensity of the reflected beam of light over time via various techniques including, for example, shuttered light pulse imaging.

In another example, the capture device 706 may use structured light to capture depth information. In such a technique, patterned light (e.g., light displayed as a known pattern such as grid pattern or a stripe pattern) may be projected onto the scene using the emitter 804. Upon striking the surface of one or more targets or objects in the scene, the pattern becomes deformed. Such a deformation of the pattern may be captured by the depth camera 802 and then be analyzed to determine a physical distance from the capture device 706 to a position on the targets or objects in the scene.

In another example, the depth camera 802 may be in the form of two or more physically separated cameras that view a scene from different angles, such that visual stereo data is obtained that may be resolved to generate depth information. In this case the emitter 804 may be used to illuminate the scene or may be omitted.

In some examples, in addition to the depth camera 802, the capture device 706 may comprise a regular video camera, which is referred to as an RGB camera 806. The RGB camera 806 is arranged to capture sequences of images of the scene at visible light frequencies, and may hence provide images that may be used to augment the depth images. In alternative examples, the RGB camera 806 may be used instead of the depth camera 802.

The capture device 706 shown in FIG. 8 further comprises at least one processor 808, which is in communication with the imaging sensor 800 (i.e. depth camera 802 and RGB camera 806 in the example of FIG. 8) and the emitter 804. The processor 808 may be a general purpose microprocessor, or a specialized signal/image processor. The processor 808 is arranged to execute instructions to control the imaging sensor 800 and emitter 804 to capture depth images and/or RGB images. The processor 808 may also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 808 from the captured depth and RGB images. The silhouette images may be processed using the methods described herein to predict two dimensional joint positions. In this case the silhouette images may be thought of as depth images flattened to a fixed depth. The captured depth images may be used to predict three dimensional joint positions as described in more detail below.

The capture device 706 shown in FIG. 8 further includes a memory 810 arranged to store the instructions that for execution by the processor 808, images or frames of images captured by the depth camera 802 or RGB camera 806, or any other suitable information, images, or the like. In some examples, the memory 810 may include random access memory (RAM), read only memory (ROM), cache, Flash memory, a hard disk, or any other suitable storage component. The memory 810 may be a separate component in communication with the processor 208 or integrated into the processor 808.

The capture device 706 also comprises an output interface 812 in communication with the processor 808 and is arranged to provide data to the computing device 704 via a communication link. The communication link may be, for example, a wired connection (such as USB (trade mark), Firewire (trade mark), Ethernet (trade mark) or similar) and/or a wireless connection (such as WiFi (trade mark), Bluetooth (trade mark) or similar). In other examples, the output interface 812 may interface with one or more communication networks (such as the internet) and provide data to the computing device 704 via these networks.

Figure 9:
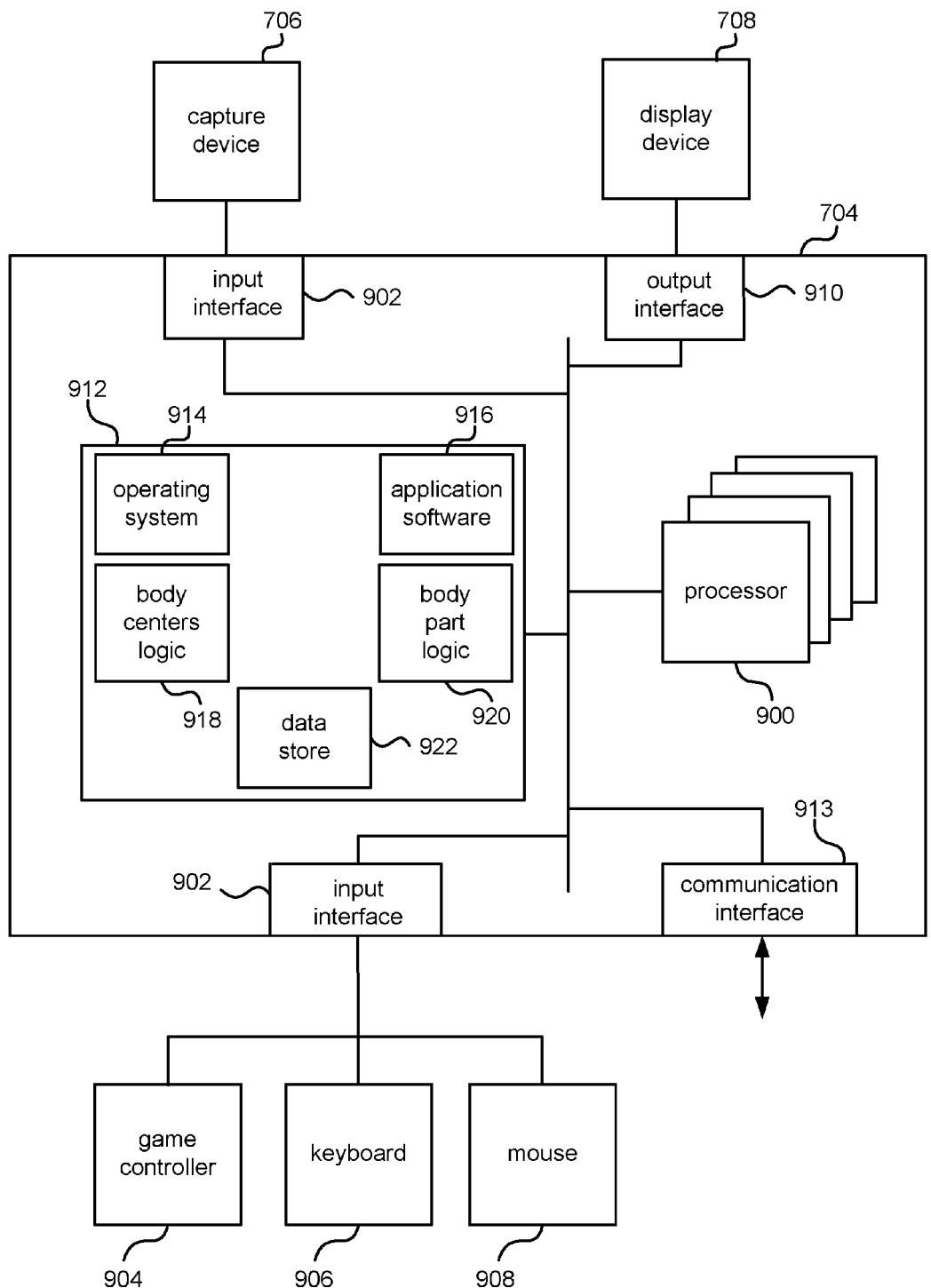
FIG. 9 illustrates an exemplary computing-based device in which embodiments of a body-part position detector may be implemented.

FIG. 9 illustrates various components of an exemplary computing-based device 704 which may be implemented as any form of a computing and/or electronic device, and in which embodiments of body part center position prediction systems may be implemented.

Computing-based device 704 comprises one or more processors 900 which may be microprocessors, controllers, graphics processing units, parallel processing units, or any other suitable type of processors for processing computing executable instructions to control the operation of the device in order to predict body part center positions in images. In some examples, for example where a system on a chip architecture is used, the processors 900 may include one or more fixed function blocks (also referred to as accelerators) which implement a part of the method of body part center positions prediction in hardware (rather than software or firmware).

The computing-based device 704 comprises one or more input interfaces 902 arranged to receive and process input from one or more devices, such as user input devices (e.g. capture device 706, a game controller 904, a keyboard 906 and/or a mouse 908). This user input may be used to control software applications or games executed on the computing device 704.

The computing-based device 704 also comprises an output interface 910 arranged to output display information to a display device 708 which may be separate from or integral to the computing device 704. The display information may provide a graphical user interface. In an example, the display device 708 may also act as the user input device if it is a touch sensitive display device. The output interface may also output data to devices other than the display device, e.g. a locally connected printing device.

The computer executable instructions may be provided using any computer-readable media that is accessible by computing based device 704. Computer-readable media may include, for example, computer storage media 912 such as memory and communications media. Computer storage media 912, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media 912 (memory) is shown within the computing-based device 704 it will be appreciated that the storage may be distributed or located remotely and accessed via a network or other communication link (e.g. using communication interface 913).

Platform software comprising an operating system 914 or any other suitable platform software may be provided at the computing device 704 to enable application software 916 to be executed on the device. Other software that may be executed on the computing device 704 includes: body centers logic 918 (see for example, FIGS. 3-6 and description above); body part logic 920 (arranged to associate a probability distribution over body parts with each image element of a depth image). A data store 922 is provided to store data such as previously received depth images; intermediate function results; parameters, probability distributions, body part labels, and other data.

The term 'computer' is used herein to refer to any device with processing capability such that it may execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software may be suitable for execution on a parallel processor or a serial processor such that the method steps may be carried out in any suitable order, or simultaneously.

This acknowledges that software may be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions may be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of compressing a depth image comprising probability information, the method comprising:
   receiving an image comprising a plurality of image elements having depth values and probability distributions over a plurality of classes representing the likelihood that the image elements are members of the classes;
   for the image elements, calculating probability masses for the classes, the probability masses calculated based on probability values of the image elements being related to the classes multiplied by squares of the depth values of the image elements;
   calculating, a plurality of output elements at lower resolution than the received image at least through aggregating the image elements on the basis of the probability masses; and
   clustering output elements to find positions of centers of the classes.

2. A method as claimed in claim 1, wherein the plurality of output elements comprises at least one of: an aggregate probability mass and a plurality of characteristics of a probability distribution; a vector having a center of mass of a probability distribution in three dimensions and an aggregate probability mass; or a downsampled body part vector having a center of mass of a body part probability distribution in at least three dimensions and an aggregate probability mass.

3. A method as claimed in claim 1 the classes being at least one of: body parts, object classes, foreground regions, or background regions.

4. A method as claimed in claim 1 the aggregation comprising:
   calculating a sum of a plurality of image elements each image element weighted by its probability mass; and
   calculating an aggregate probability mass by aggregating the probability masses of the plurality of image elements.

5. A method as claimed in claim 1 wherein calculating the output elements is carried out in parallel for the classes.

6. A method as claimed in claim 1 comprising selecting a scale according to depth of a foreground region of the depth image and calculating the output elements according to that scale.

7. A method as claimed in claim 1, further comprising:
   selecting a plurality of scales and calculating a first group of the output elements according to a first one of the plurality of scales; and
   calculating a second group of the output elements according to a second one of the plurality of scales.

8. A method as claimed in claim 1 wherein clustering comprises clustering selected output elements at least partly on the basis of the probability masses to obtain body part center positions where the classes are body parts.

9. A method as claimed in claim 8 using a mean shift process whereby the output elements are repeatedly shifted according to weighted aggregations of neighboring output elements.

10. A method as claimed in claim 9 comprising calculating a certainty for a body part center position using the probability mass of the plurality of output elements which were shifted to a cluster for that body part in the mean shift process or by counting output elements in a cluster.

11. An apparatus for compressing a depth image comprising:
    an input arranged to receive an image comprising a plurality of image elements having depth values and probability distributions over a plurality of classes representing the likelihood that the image elements are members of the classes; and
    a processor programmed to:
    calculate probability masses for the classes, the probability masses being probability values multiplied by squares of the depth values of the image elements, the probability values being related to probabilities of the classes for the image elements;
    calculate a plurality of output elements at lower resolution than the received image by aggregating the image elements on the basis of the probability masses; and
    cluster output elements to find positions of centers of the classes.

12. An apparatus as claimed in claim 11 wherein calculation of the plurality of output elements comprises at least one of: an aggregate probability mass and a plurality of characteristics of a probability distribution; a vector having a center of mass of a probability distribution in three dimensions and an aggregate probability mass; or a downsampled body part vector having a center of mass of a body part probability distribution in one of at least three dimensions and an aggregate probability mass.

13. An apparatus as claimed in claim 11 the processor being arranged to:
    carry out the aggregation through calculating a sum of a plurality of image elements weighted by its probability mass; and
    calculate an aggregate probability mass through aggregating the probability masses of the plurality of image elements in the image.

14. An apparatus as claimed in claim 11 the processor being arranged to determine a center of at least one of the image elements in the lower resolution based on at least some of the probability masses.

15. An apparatus as claimed in claim 11 the processor being arranged to select a scale according to a depth of a foreground region of the depth image and to calculate the output elements according to that scale.

16. An apparatus as claimed in claim 11 the processor being arranged to:
select a plurality of scales and to calculate a first group of the output elements according to a first one of the plurality of scales; and
calculate a second group of the output elements according to a second one of the plurality of scales.

17. A computer-implemented method comprising:
receiving an image comprising a plurality of image elements each having a depth value and a probability distribution over a plurality of body parts representing the likelihood that the image element is a member of each of the body parts;
for each image element, calculating a probability mass for each body part, the probability mass being a probability value multiplied by the square of the depth value of the image element, the probability value being related to a probability of the body part for the image element;
calculating, for each body part, a plurality of output elements at a lower resolution than the received image by aggregating the image elements on the basis of the probability mass;
clustering output elements to find positions of centers of the body parts.

18. A method as claimed in claim 17 comprising determining a certainty for each of the positions of centers of the body parts by using probability masses of the output elements or by counting output elements in clusters.

19. A method as claimed in claim 17 comprising filtering output elements on the basis of probability mass before carrying out the clustering.

20. A method as claimed in claim 17 comprising selecting a scale according to depth of a foreground region of the depth image and calculating the output elements according to that scale.

* * * * *